United States Patent
Wong

(10) Patent No.: US 10,936,838 B1
(45) Date of Patent: Mar. 2, 2021

(54) TAGGING SCHEME FOR BLOCKCHAIN-BASED PROVENANCE SYSTEM

(71) Applicant: Wang-Chan Wong, Irvine, CA (US)

(72) Inventor: Wang-Chan Wong, Irvine, CA (US)

(*) Notice: Subject to any disclaimer, the term of this patent is extended or adjusted under 35 U.S.C. 154(b) by 0 days.

(21) Appl. No.: 17/006,147

(22) Filed: Aug. 28, 2020

(51) Int. Cl.
*G06K 7/14* (2006.01)
*G06K 19/06* (2006.01)

(52) U.S. Cl.
CPC ......... *G06K 7/1417* (2013.01); *G06K 7/1413* (2013.01); *G06K 19/06028* (2013.01); *G06K 19/06037* (2013.01)

(58) Field of Classification Search
CPC .............. G06K 7/1417; G06K 7/1413; G06K 19/06028; G06K 19/06037
USPC ...................................... 235/462.1
See application file for complete search history.

(56) References Cited

U.S. PATENT DOCUMENTS

| | | | |
|---|---|---|---|
| 7,927,688 B2 * | 4/2011 | Abrams ............. | G09F 3/04 428/195.1 |
| 2004/0153649 A1 * | 8/2004 | Rhoads ............. | G07D 7/004 713/176 |
| 2010/0306532 A1 * | 12/2010 | Komatsu ............ | G09C 5/00 713/156 |
| 2015/0028579 A1 * | 1/2015 | Boutant ............. | G06F 21/36 283/67 |
| 2015/0193900 A1 * | 7/2015 | Lau .................. | G06K 9/325 382/100 |
| 2015/0248678 A1 * | 9/2015 | Wee .................. | G06Q 30/0185 705/318 |
| 2015/0302421 A1 * | 10/2015 | Caton ............... | G06F 21/36 705/17 |
| 2020/0083954 A1 * | 3/2020 | Bergqvist ........... | G06K 9/6289 |

* cited by examiner

*Primary Examiner* — Paultep Savusdiphol
(74) *Attorney, Agent, or Firm* — Helen Mao; Imperium Patent Works

(57) ABSTRACT

Methods and system are provided for tagging scheme for blockchain-based provenance system. In one novel aspect, a unique signature is created based on a polygonized unique object ID. The polygonized unique ID is randomly placed in an authentication area of an ID tag, where vertex coordinates of the ID polygon can be obtained. The signature information of the authentication area of the ID tag is recorded in blockchain. New ID polygons are associated with the tagged object in one or more ID tags. The new authentication area or the newly updated authentication area are appended to the blockchain. In one embodiment, the ID polygon is obtained by polygonizing the associated unique operator ID. In another embodiment, the ID polygon is an ID code of the associated unique operator ID superposed on a predefined polygon, and wherein the ID code is one of a QR code and a bar code.

20 Claims, 8 Drawing Sheets

TAGGING SCHEME FOR BLOCKCHAIN-BASED PROVENANCE SYSTEM

TECHNICAL FIELD

The present invention relates generally to secured tagging scheme and, more particularly, a secured tagging scheme for blockchain-based provenance system.

BACKGROUND

There is an increasing demand from consumers for greater transparency on farming, food production, and distribution. The lack of trust of the existing system, e.g., failure of a variety of certification schemes and brand guarantees, intensifies the search for a better system. In the current situation, the certification and compliance data are created and kept by trusted third parties who typically store the data and information in a centralized database. This type of information systems is the culprit of the majority of fraud and corruption cases. The problems occur both in the paperwork, e.g., certifying process, and within the IT information systems, e.g., intentional alteration by the organization or by hackers. There have been reported food safety issues around the globe, which caused severe health concerns. An anti-counterfeiting packaging system is essential to ensure the food safety. There are sophisticated anti-counterfeiting packaging methods and devices. Unfortunately, these solutions are expensive. Due to its forbidden cost, the traditional anti-counterfeiting method and system are hard to be widely adopted. Essentially, anti-counterfeiting packaging to aid traceability can be applied to all goods going through a supply chain. In other areas, anti-counterfeiting in the digital age where signatures are traditionally used requires a cost-effective and secured system. For example, printed documents, especially legal and business papers such as grand deeds, wills, and trust papers, are still widely used. To authenticate the signed document and securely store the digitized copies requires a cost-efficient anti-counterfeiting system.

An inexpensive and effective tagging scheme to support anti-counterfeiting is needed.

SUMMARY

Methods and systems are provided for tagging schemes for blockchain-based provenance systems. In one novel aspect, a unique signature is created based on a polygonized unique ID. The polygonized unique ID is randomly placed in an authentication area attached to a tagged object, where vertex coordinates of the ID polygon can be obtained, hence the signature. The signature information of the authentication area is recorded in a blockchain. New ID polygons are associated with the tagged object in one or more authentication areas attached to the tagged object. The new authentication area or the newly updated authentication area is appended to the blockchain. In one embodiment, the ID polygon is obtained by polygonizing the associated unique operator ID. In another embodiment, the ID polygon is an ID code of the associated unique operator ID superposed on a predefined polygon, and wherein the ID code is one of a QR code and a bar code. In one embodiment, the authentication area comprises a plurality of anchor corners for boundary and posture detection, timing patterns for coordinates identification in the tagging area, and the tagging area. In another embodiment, the authentication area is a rectangle, wherein three corners of the rectangle are squared anchors and a fourth corner is marked with two borderlines, and wherein the timing patterns are marked on two boundaries of the rectangle each connected with a pair of the squared anchor corners. In yet another embodiment, the signature information of corresponding authentication area comprises at least one of a photographic image of the authentication area, unique ID of each ID polygon in the authentication area, and coordinates of each vertex of each ID polygon in the authentication area.

In another novel aspect, a user equipment application (APP) scans an authentication area wherein the authentication area is attached to a tracked object, and wherein a tagging area of the authentication area has at least one identification (ID) polygon, and wherein the ID polygon is generated using a unique operator ID, obtains local vertex coordinates with respect to the authentication area of one or more ID polygons in the scanned authentication area, retrieves signature information of the authentication area from a blockchain, wherein the signature information of the authentication area includes at least vertex coordinates with respect to the authentication area of one or more ID polygons in the authentication area, and authenticate the tagged object by comparing the local vertex coordinates with the retrieved signature information.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

There are a wide range of anti-counterfeit technologies available. Good anti-counterfeit technologies should be easily applied but difficult to imitate. It should be difficult to duplicate or forge, it is hard to re-label or reuse, and it is easily noticeable when tampered. There are two types of anti-counterfeit technologies, authentication verification, and tracking and tracing. With the addition of blockchain-based technology, these two approaches are easily combined. For example, by using authentication verification technologies for packaging and using blockchain to track and trace, one can create a robust blockchain-based provenance tracking system. While blockchain has the properties of immutability and irreversibility of transactions being recorded, it is guaranteed only on the accuracy of the data and info inside the blockchain. Blockchain itself does not guarantee product authenticity. Trustworthiness depends on the tagging and packaging of the products, for example, anti-counterfeit packaging materials and sensors. The existing authentication and/or tracing technologies are expensive for massive use, such as individual food packaging and sometimes require special devices. Some of the technologies are still subject to intentional tampering and counterfeiting.

In one novel aspect, a tagging scheme is provided. A unique signature of the operators is created. As the object being tracked passing through the hands of operators, an operator signature is attached to the tagged object. The operator signature is a unique digital signature using polygons. Each transaction is recorded in a blockchain along with the signature of the operator or custodian of the event. Combined with the anti-counterfeiting packages, the tagging scheme safeguards both the physical product and data/information flows and secures their provenance. The tagging scheme is (1) relatively inexpensive, (2) no need to use special equipment other than the camera to register and authenticate the product. The tagging scheme is robust. The counterfeiter will spend much more effort to make a perfect counterfeit, which may not make economic sense to make fake products. Hence, there is not much financial incentive in doing so.

Figure 1:
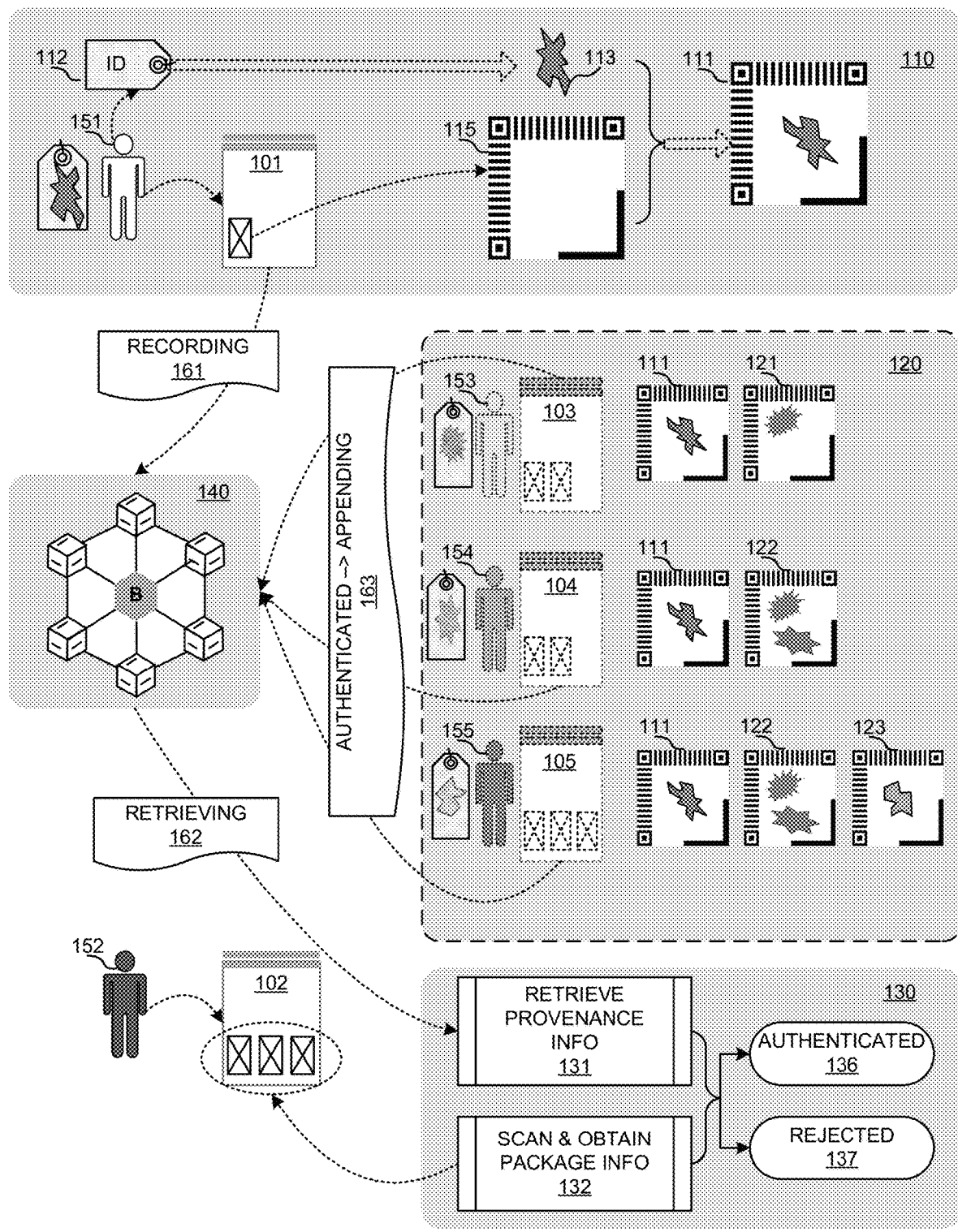
FIG. 1 illustrates exemplary diagrams of a polygon tagging scheme for blockchain-based provenance system in accordance with embodiments of the current invention.

FIG. 1 illustrates exemplary diagrams of a polygon tagging scheme for blockchain-based provenance system in accordance with embodiments of the current invention. The blockchain-based provenance system includes a tagged object 101, an operator 151, a user 152 and a blockchain database 140. The tagging scheme has three integral components (1) polygon sticker creation (STK), (2) packaging with authentication area (AA), and (3) sticker registration and authentication APP (SRAP). The blockchain-based authentication and tracking process includes an entry creation and recording subprocess 110, a user-authentication subprocess 130, and an optional operator/custodian authentication and appending subprocess 120. In subprocess 110, the origin of the data will be recorded to blockchain 140 through recording process 161. User 152, in authenticating the tagged object, will retrieve the signature information from blockchain 140 via retrieving process 162. In some embodiment, as the tagged object transfer through custodians, such as 153, 154, and 155, the signature information of the tagged object will be first retrieved from blockchain 140 for authentication. Once authenticated, new signatures of the custodians, such as 153, 154, and 155 will be created, respectively. The new signature information will be appended to blockchain 140 in procedure 163.

In one novel aspect, each operator or custodian of the tagged object 101 is assigned a unique operator identification (ID). A polygon signature sticker is created using the unique operator ID for each corresponding operator. The operator randomly places the polygon in a tagging area that is part of the authentication area attached to tagged object 101. An operator or custodian, such as operators 151, 153, 154, and 155, is a person who handles the tagged object 101. For example, a factory worker in the packaging assembly line, a farmer, or a fisherman who harvests crops or fish; a warehouse staff who receives the package are custodians/operators who handle the tagged object 101. The vertex coordinates in the authentication area and/or the photo image of the authentication area containing the polygon signature are recorded in blockchain 140.

In entry creation and recording subprocess 110, the tagged object 101, such as product package is prepared with an authentication area 115. The origin operator 151 is assigned a unique operator ID 112. In one novel aspect, a polygon signature 113 is generated based on the assigned unique operator ID 112. In one embodiment, rolls of self-adhesive polygon stickers with polygon 113 will be created and distributed to the operator 151 with unique operator ID 112. Polygon signature 113 will be randomly placed in the tagging area of authentication area 115. The authentication area 111 with the randomly placed polygon 113, is attached to tagged object 101. In one embodiment, operator 151 will manually adhere his sticker to the authentication area. Operator 151 will use a sticker registration and authentication (SRA) APP to take a picture of the package of tagged object 101 with the sticker. The sticker's vertices will be captured, and their coordinates are obtained. Since this is a manual process or the polygon is randomly placed in the authentication area, it will be very unlikely for a counterfeiter to place the sticker to the exact coordinates manually. The placement of the sticker on the authentication area becomes a unique signature of the operator 151. The pictures and the tuple (ID, vertex coordinates) will be recorded to the blockchain as the origin.

When the package is transited to another custodian, subprocess 120 authenticate the received tagged object and append new signature information to blockchain 140. The custodian will use the SRAP APP to perform two functions. First, the custodian will use the APP to take a picture of the package. The SRA APP will identify the ID and the vertex coordinates, the identical process as in sticker registration described above. The data of the ID in the blockchain will be retrieved and compared. If the vertex coordinates match, the package is a genuine package. Then the custodian will adhere his sticker in the authentication area. Next, the custodian will use the APP to take a picture to register his sticker. The second sticker vertex coordinates will be obtained. Both the picture and vertex coordinates will be appended to the blockchain. Each time the package changes hands, a similar process will take place. In one embodiment, a new authentication area is attached to the tagged object with a new ID polygon. Upon authenticating tagged object 101, operator 153 with a corresponding ID polygon randomly places the ID polygon to the tagging area of a new authentication area and attached the new authentication area 121 to the tagged object 103. In another embodiment, the new polygon signature is placed in a previously created authentication area. Upon authenticating tagged object 104, operator 155 with a corresponding ID polygon randomly places the ID polygon to the tagging area of a new authentication area 123. The authentication area 123 attached to the tagged object 105 has three authentication areas 111, 122, and 123.

At the end of the logistic chain, subprocess 130 authenticate the tagged object and determine whether the object is authenticated and acceptable or should be rejected. The package of tagged object 102 will have stickers of each custodian authenticated and recorded, including authentication areas 111, 122, and 123 with ID polygons of operators 151, 153, 154, and 155. Finally, when the product is sold to a customer/user 152, at step 132, user 152 will use an authentication APP to take a picture of the stickers on the authentication area. User 155 retrieves provenance information of the tagged object from blockchain 140 at step 131. The APP will validate the coordinates of the stickers against those stored in the blockchain and will determine if the product is genuine or not. At step 136, the user may accept the tagged object as being authenticated. At step 137, if the comparison determines no match, the tagged object is rejected. In one embodiment, the logistic information of the product captured in the blockchain will be shown to the customer.

Figure 2:
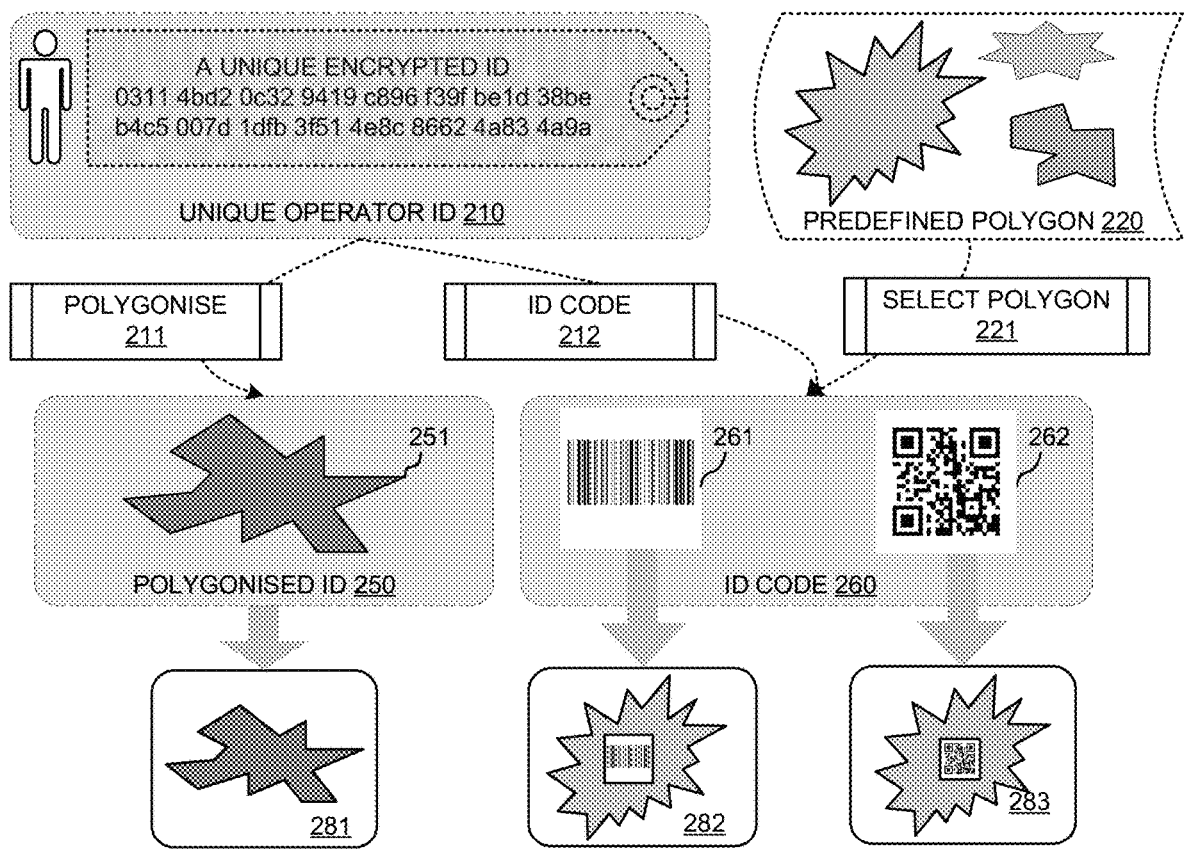
FIG. 2 illustrates exemplary diagrams for ID polygon creation based on a unique ID of the operator ID in accordance with embodiments of the current invention.

FIG. 2 illustrates exemplary diagrams for ID polygon creation based on a unique ID of the operator ID in accordance with embodiments of the current invention. In one novel aspect, ID polygons are created based on a unique operator ID. In one embodiment, an ID polygon 250 is created based on the operator ID. In another embodiment, predefined polygon is selected with unique ID code embedded in the selected polygon.

As illustrated, a unique operator ID 210 is assigned to the operator. Unique operator ID 210 is polygonized at step 211. Polygon 251 is generated by polygonize the unique operator ID 210. In one embodiment, polygon sticker 281 is created using polygon 251. In one embodiment, unique ID 210 is represented by a unique SHA256 hash key and is represented by 64 Hex characters. In one embodiment, a noncrossing Euclidean irregular polygon of the ID. The 64-character Hex ID can be partitioned into sixteen groups of 4-character. The 4-character of each group becomes the coordinate of a vertex of a polygon. Hence, each SHA256 hash key is represented by an irregular polygon of sixteen vertices with coordinates between [0, 255]. The irregular polygon is essentially the Hamilton circuit as in graph theory. Given an arbitrary set of sixteen vertices, unfortunately, there may not exist a Hamilton circuit. Therefore, for each SHA256 ID, it is necessary to first test if there exists a Hamilton circuit. Fortunately, there are efficient algorithms that could validate if a Hamilton circuit exists or not for an arbitrary set of vertices. If it does not exist, the key will be abandoned, and a new key will be generated. The merit of this approach is that the resulting irregular polygon will be different for each tag.

In another embodiment, a unique ID code is generated and placed on a predefined polygon to create the unique ID polygon. ID code 260 is created at step 212 based on unique operator ID 210. ID code 260 can be in any form that the unique operator ID can be identified. In one embodiment, the ID code is a bar code 261 representing unique operator ID 210. In another embodiment, the ID code is a QR code 262 representing unique operator ID 210. At step 221, a polygon is selected from one or more predefined polygon 220. In one embodiment, the selection of the polygon from predefined polygons 220 is based on one or more predefined polygon selection rules. In one embodiment, the selection of the polygon is based on the unique operator ID. In other embodiments, group IDs, product IDs, timestamps, or a combination of a set of selection criteria are used for the selection of the polygon. In yet another embodiment, the selection rules can be dynamically updated. ID code 261 is embedded in the selected polygon to create an ID polygon 282. In another embodiment, ID code 262 is embedded in the selected polygon to create an ID polygon 283.

Figure 3:
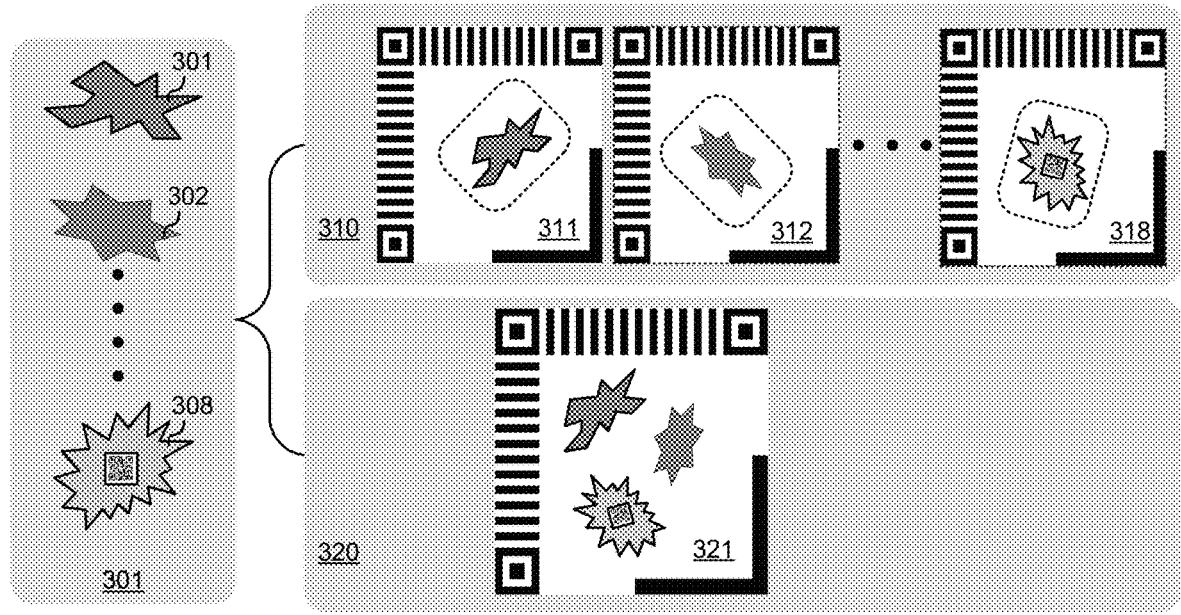
FIG. 3 illustrates exemplary diagrams for the different embodiment of placing ID polygons in the authentication area in accordance to embodiments of the current invention.

FIG. 3 illustrates exemplary diagrams for different embodiments of placing ID polygons in the authentication area in accordance to embodiments of the current invention. ID polygons 301, 302, and 308 are generated for each operator handling the tagged object, such as a package of a product. When the package of the product changes hands from custodian to custodian, stickers will be adhered to an authentication area. In one embodiment, to obtain the coordinates of the vertices of the ID polygon, the authentication area is printed with squares or rectangles. In one embodiment 310, each ID polygon has its own authentication area. ID polygons 301, 302, and 308 are placed in different authentication areas 311, 312, and 318, respectively. In another embodiment 320, all ID polygons are placed in one authentication area 321. In yet another embodiment, multiple authentication areas are attached to the tagged object with some authentication area has one ID polygon and others have more than one ID polygon. The ordering of the ID polygons, such as a polygon sticker placed in the authentication area, can be random. The ordering of the ID polygons being attached to the tagged object is explicitly recorded in the blockchain.

The ID polygon tagging scheme provides a cost-efficient system to authenticate and trace objects being tracked. While replicating the stickers will be difficult, to assure the product authenticity it is necessary to adopt anti-counterfeiting packaging materials. With the current invention of the sticker signature, a simple threading bag or box is sufficient. Sealing threads can be placed underneath the authentication area. If the stickers are removed, it will break the sealing thread. Re-applying stickers from one package and re-applying to others will become visible by the naked eyes. Replacing the content of the bag or box with inferior or counterfeit goods will also damage the packaging. In addition, once the stickers are registered in the blockchain, double spending of the stickers can be avoided.

Figure 4:
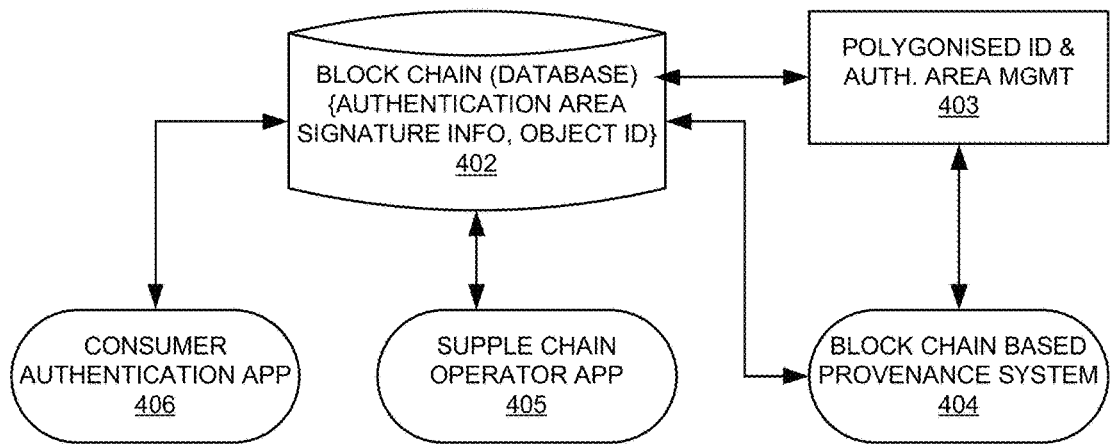
FIG. 4 illustrates an exemplary diagram of a packaging procedure using the polygon tagging scheme for a blockchain-based provenance system in accordance with embodiments of the current inventions.

FIG. 4 illustrates an exemplary diagram of a packaging procedure using the polygon tagging scheme for a blockchain-based provenance system in accordance with embodiments of the current inventions. The blockchain-based provenance system is based on the Internet infrastructure where a decentralized blockchain 402 is connected to a blockchain-based provenance system 404, a supply chain operator/trading partner application 405, and a consumer/end user application 406. ID polygon and authentication area management entity 403 is connected to blockchain-based provenance system 404 and decentralized blockchain 402. A blockchain-based provenance system, such as a Hyperledger, is created. The supply chain operators and/or trading partners of the provenance system will work with the system with their applications to decide on the sticker design, printing, and assignment. All data of the provenance system are stored in the blockchain.

Figure 5:
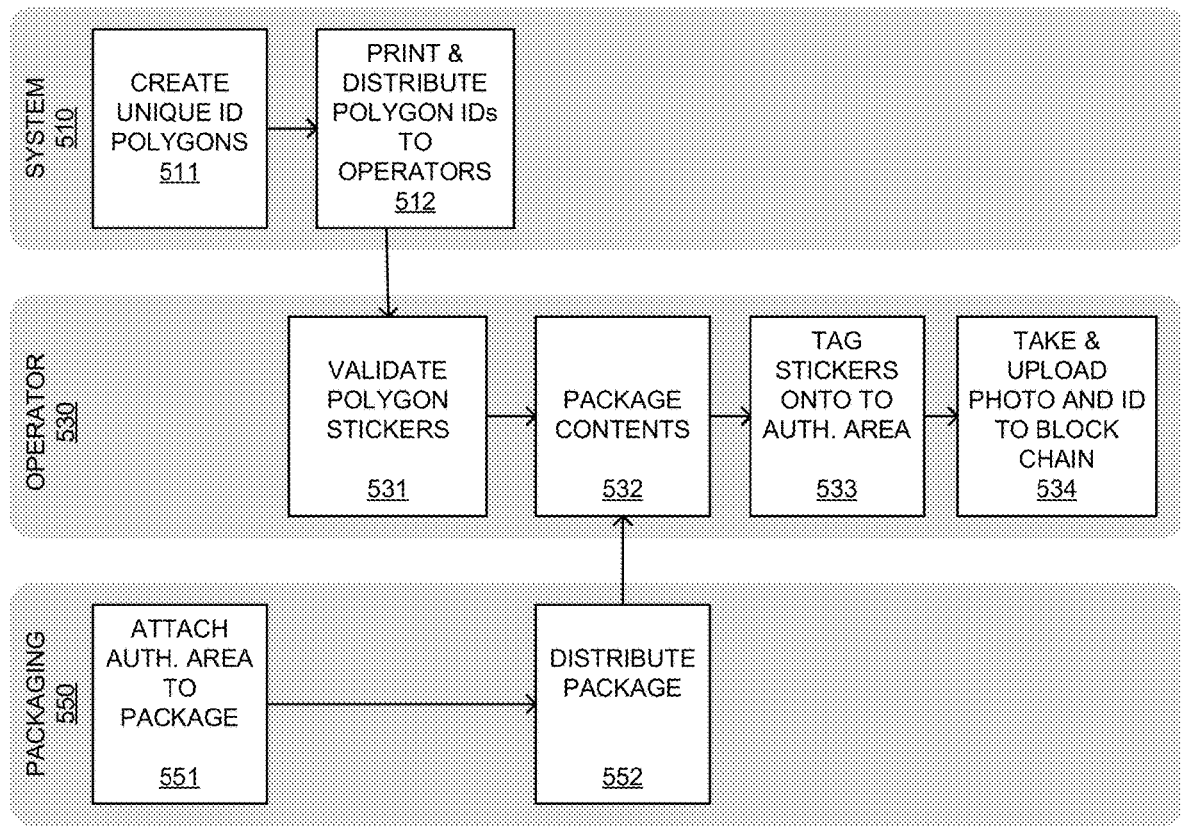
FIG. 5 illustrates exemplary diagrams of polygon tagging scheme component procedures in accordance to embodiments of the current invention.

FIG. 5 illustrates exemplary diagrams of polygon tagging scheme component procedures in accordance to embodiments of the current invention. Three subsystems, a tagging system 510, operators 530 and packaging 550, involve in creating and appending tagging/signature entries using the polygon tagging scheme. At step 511, system 510 creates ID polygon for each operator with a unique operator ID. In one embodiment, self-adhesive stickers of the ID polygon are produced. At step 512, the ID polygons will be distributed to corresponding operators. In one embodiment, sticker rolls with corresponding printed ID polygons will be given to the operator. The packaging subsystem at step 551 prepares the anti-counterfeiting threading packaging materials, such as bags and boxes, along with the authentication area. In one embodiment, the authentication areas are printed on packaging boxes. At step 552, the prepared packages are distributed to the operators 530. At step 532, the operator 530 will first validate the stickers to ensure the correct assignment. At step 533, operator 530 will use the anti-counterfeiting packaging from step 532 to package the product in the bag or box. At step 533, operator 530 will take a preprinted, self-adhesive polygon sticker from the sticker rolls produced in step 512 and manually tag the sticker to the authentication area of the packaging materials produced. Since the ID polygon stickers are manually placed in the tagging area of the authentication area, the coordinates of the polygon vertices are difficult, and cost forbidden to replicate. At step 534, operator 530 will use the SRAP APP described in Section 5 to take a picture of the package with the sticker. The APP will compute the vertex coordinates. The picture and vertex coordinates will be appended to the blockchain.

The polygon tagging scheme can be used for cost-effective authentication and tracking of products, such as food and other items. It can also be used for digitized authentication of documents, such as grant deeds, contracts, and other papers that requires signatures. The logistic of the processes for the operator and the consumer/user are describes in the following drawings.

Figure 6:
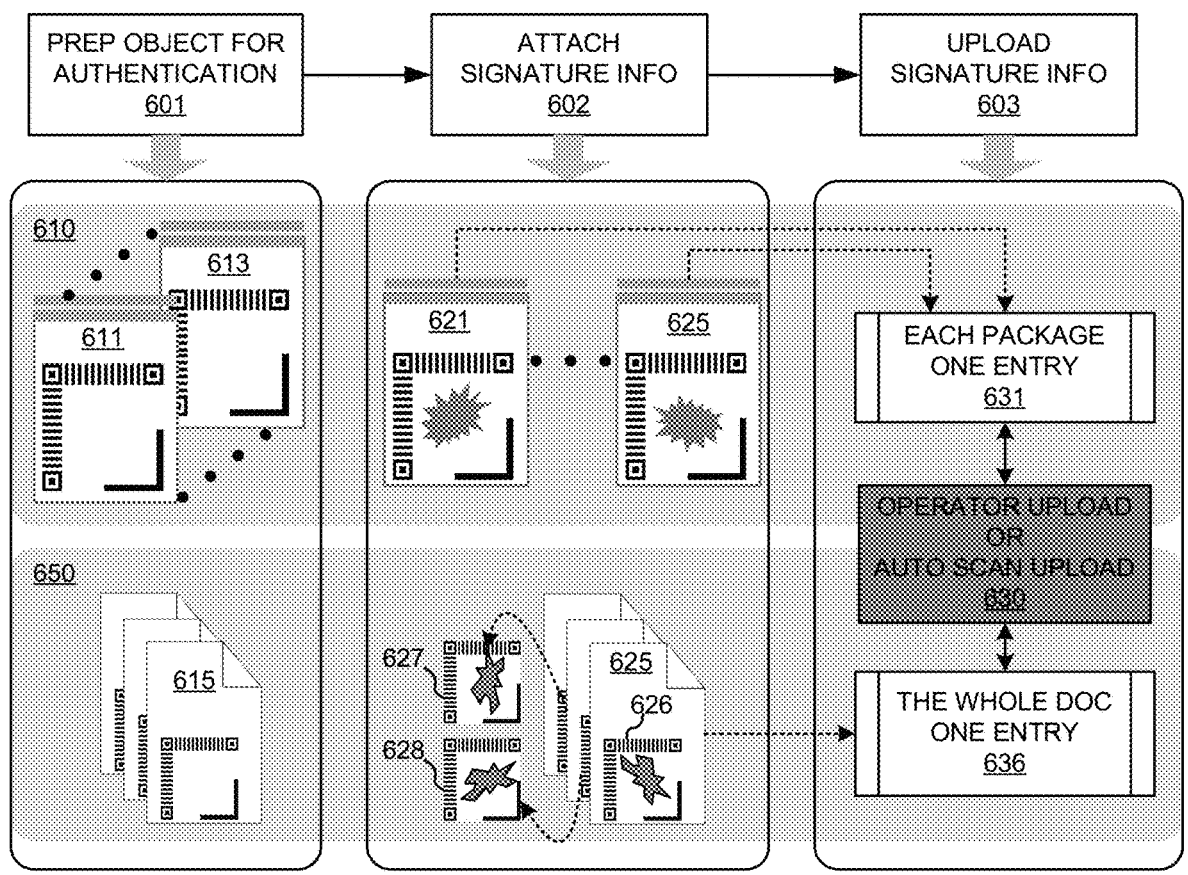
FIG. 6 illustrates exemplary diagrams for operator scenarios for authenticating tagged object using the polygon tagging scheme in accordance with embodiments of the current invention.

FIG. 6 illustrates exemplary diagrams for operator scenarios for authenticating tagged object using the polygon tagging scheme in accordance with embodiments of the current invention. At step 601, the operator will prepare the tagged object for polygon tagging authentication. At step 602, the operator attaches signature information to the tagged object using the ID polygon generated based on the unique operator ID. At step 603, the operator uploads attached signature information with information of the tagged object to a database. In one embodiment, the database is a blockchain. Exemplary use cases 610 and 650 are illustrated representing operator of a packaging authentication and operator of a documentation signature operation.

Operator for a packaging operation 610 prepares one or more packages, such as packages 611 and 613 for authentication. Operator randomly places the ID polygon in the tagging area of each authentication area attached to the packages. The one or more tracked packages with ID polygons, such as packages 621 and 625 are uploaded to the blockchain. In one embodiment, such as the use cases of package tracking, each package is uploaded as a separate entry. In one embodiment 630, the uploading of a large quantity of packages can be done using industrial cameras and use automated procedures to take photos and upload the photo images to the blockchain.

In another use case 650, a document 615 has one or more signatures. The signatory operator randomly places his/her ID polygons in the tagging area of each authentication area, where signatures are required. The digital signed document 625 has ID polygon placed in authentication areas 626, 627 and 628. In one embodiment, as in the use case 650, one ID polygon corresponding to one unique operator ID is randomly placed in multiple authentication area. The multiple authentication area with multiple corresponding ID polygons are uploaded as one entry to the blockchain. In other embodiment, the ID polygon can be printed on stickers. The sticker can further be an invisible ink stamp. In another embodiment, when a document is changed hand, a new sticker/signature will be added both onto the paper and the blockchain to record the read/write/approve activity.

Figure 7:
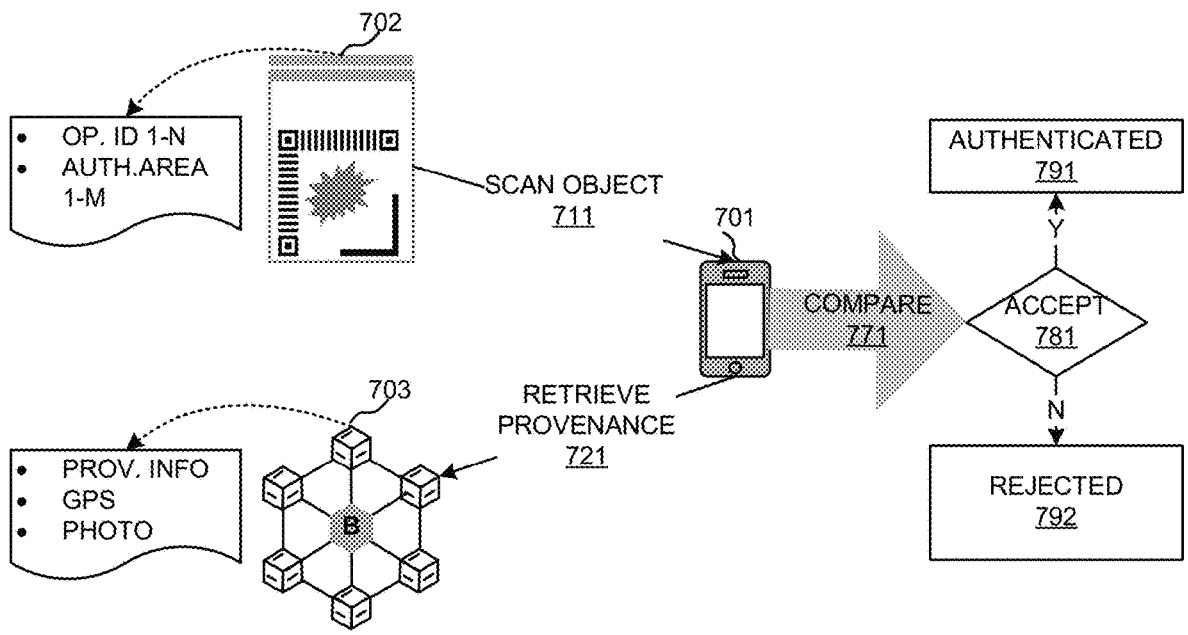
FIG. 7 illustrates exemplary diagrams for consumer/user to accept or reject a tagged object using the polygon tagging system in accordance with embodiments of the current invention.

FIG. 7 illustrates exemplary diagrams for consumer/user to accept or reject a tagged object using the polygon tagging system in accordance with embodiments of the current invention. When a consumer/user 701 received the package 702, the consumer needs to download a consumer version SRAP APP from a trusted source. The APP, at step 711, scans the stickers in the authentication area. There are one or more (1-*n*) ID polygons in one or more (1-*m*) authentication areas. At step 721, the APP retrieves provenance information from blockchain 702. The retrieved information may include provenance information of ID polygons, GPS location information related to each ID polygon, and photo images of each added ID polygons. The vertex coordinates and ID of the scanned authentication are compared to the coordinates in the blockchain at step 771. If the vertex coordinates scanning error are below the acceptable threshold at step 781, the package he received is authenticated at step 791, otherwise, the package is rejected at step 792. In one embodiment, the provenance info along with the pictures are then accessible upon retrieval from blockchain 703.

In one novel aspect, a unique authentication area design to provide coordinates information of polygon vertices. The coordinates of the ID polygon vertices can be used to authenticate a tagged object, which the authentication area is attached to.

Figure 8:
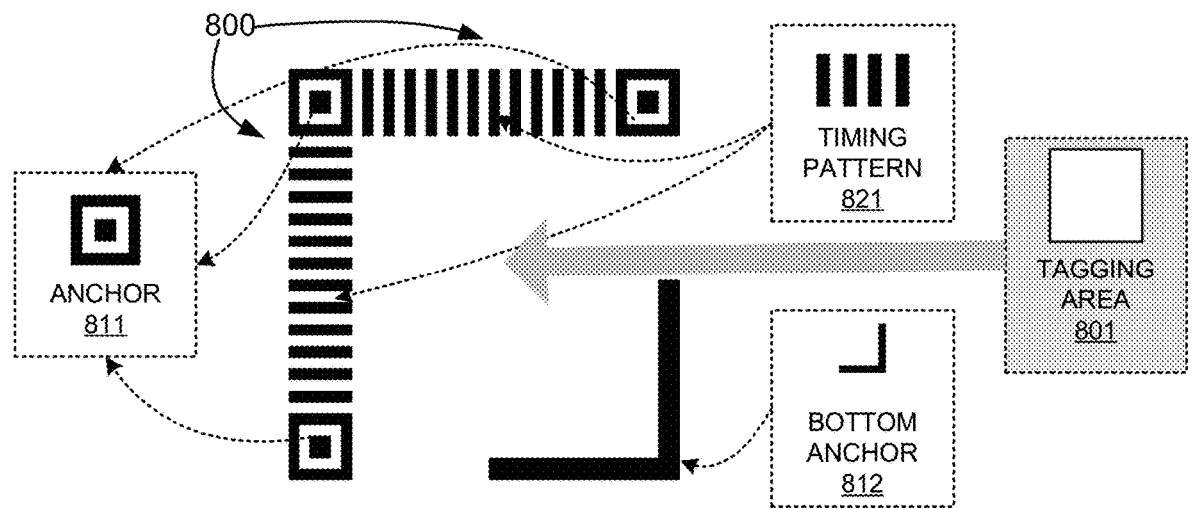
FIG. 8 illustrates an exemplary diagram of an authentication area to enable obtaining vertex coordinates of a polygon placed in the tagging area of the authentication area in accordance with embodiments of the current invention.

FIG. 8 illustrates an exemplary diagram of an authentication area to enable obtaining vertex coordinates of a polygon placed in the tagging area of the authentication area in accordance with embodiments of the current invention. Authentication area 800 is characterized by three square anchors 811 of the rectangle. In addition to the three anchors, there is a bottom anchor 812 that marks the lower right-hand corner of the area. In one embodiment, the bottom anchor 812 is about half of the dimension of each corresponding side of the rectangle to make the area detection more efficient. Timing patterns 821 are marked on the top and on the left-hand boundary of the area. The granularity of the timing patterns is configurable depending on the accuracy requirements. The center of the authentication area is the tagging area 801. One or more non-overlapping ID polygons in the shape of polygon are placed in the tagging area, where vertex coordinates of each polygon can be obtained with references to the authentication area. The vertex coordinates are used for authentication and tracking for which the authentication area is attached to.

Figure 9:
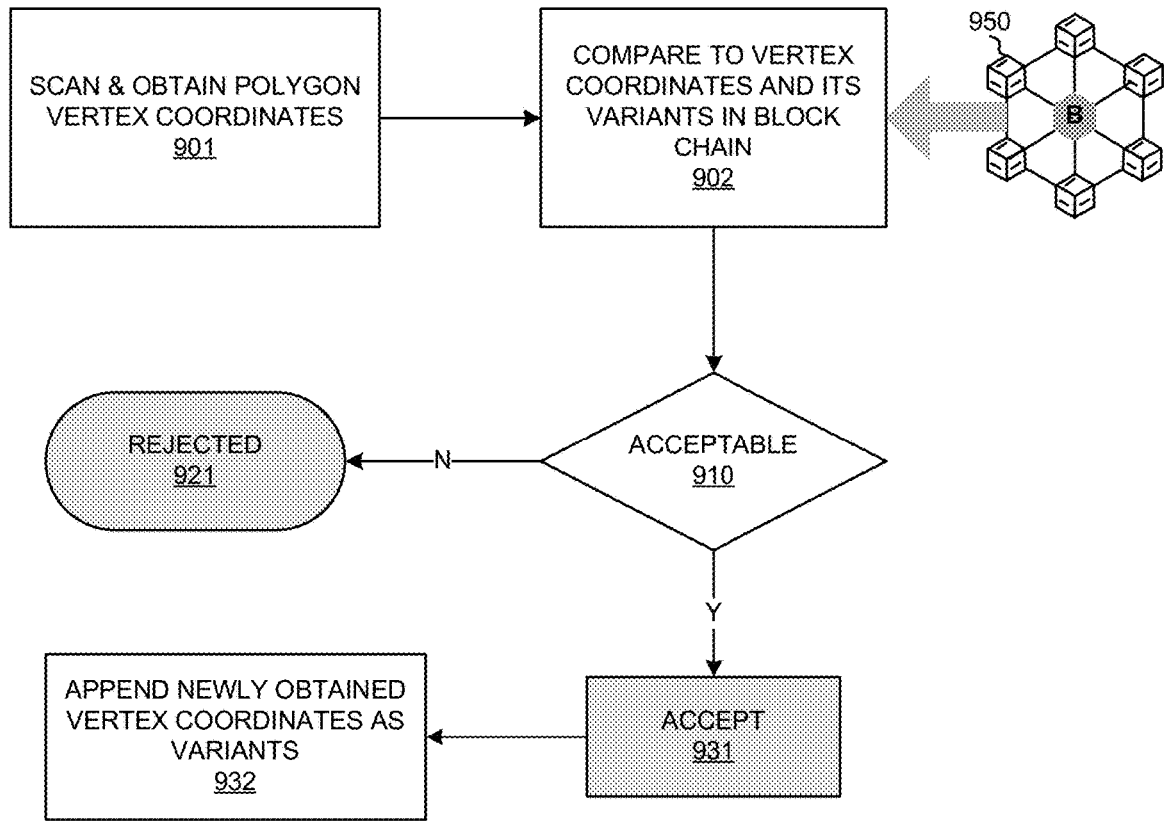
FIG. 9 illustrates exemplary diagrams of an authentication process for an operator or a user using the polygon tagging scheme in accordance with embodiments of the current invention.

FIG. 9 illustrates exemplary diagrams of an authentication process for an operator or a user using the polygon tagging scheme in accordance with embodiments of the current invention. When an operator or consumer needs to authenticate the package, identical steps will be followed to obtain the vertex coordinates of the package at that time, the vertex coordinates will be compared to the one registered and are variants. At step 901, the polygon image is obtained, and its vertex coordinates are derived. Using an ID of the tagged object, the registered vertex coordinates and their variants, if any, will be retrieved from blockchain 950. At step 902, the difference between the newly accepted coordinates and its registered and variant coordinates will be compared. Step 910 determines whether the difference is below a predefined threshold to determine if the difference is acceptable. If the difference is not acceptable, at step 921, the authentication rejected the tagged object. If the difference is acceptable, the tracked package is accepted at step 931. At step 932, the newly acquired coordinates will be appended to the blockchain as a variant of the original coordinates. The acceptable threshold depends on the market value of the content being packaged. It can be decided along with a risk management scheme. For products that have less value or will be less consequential, the threshold can be lower.

Figure 10:
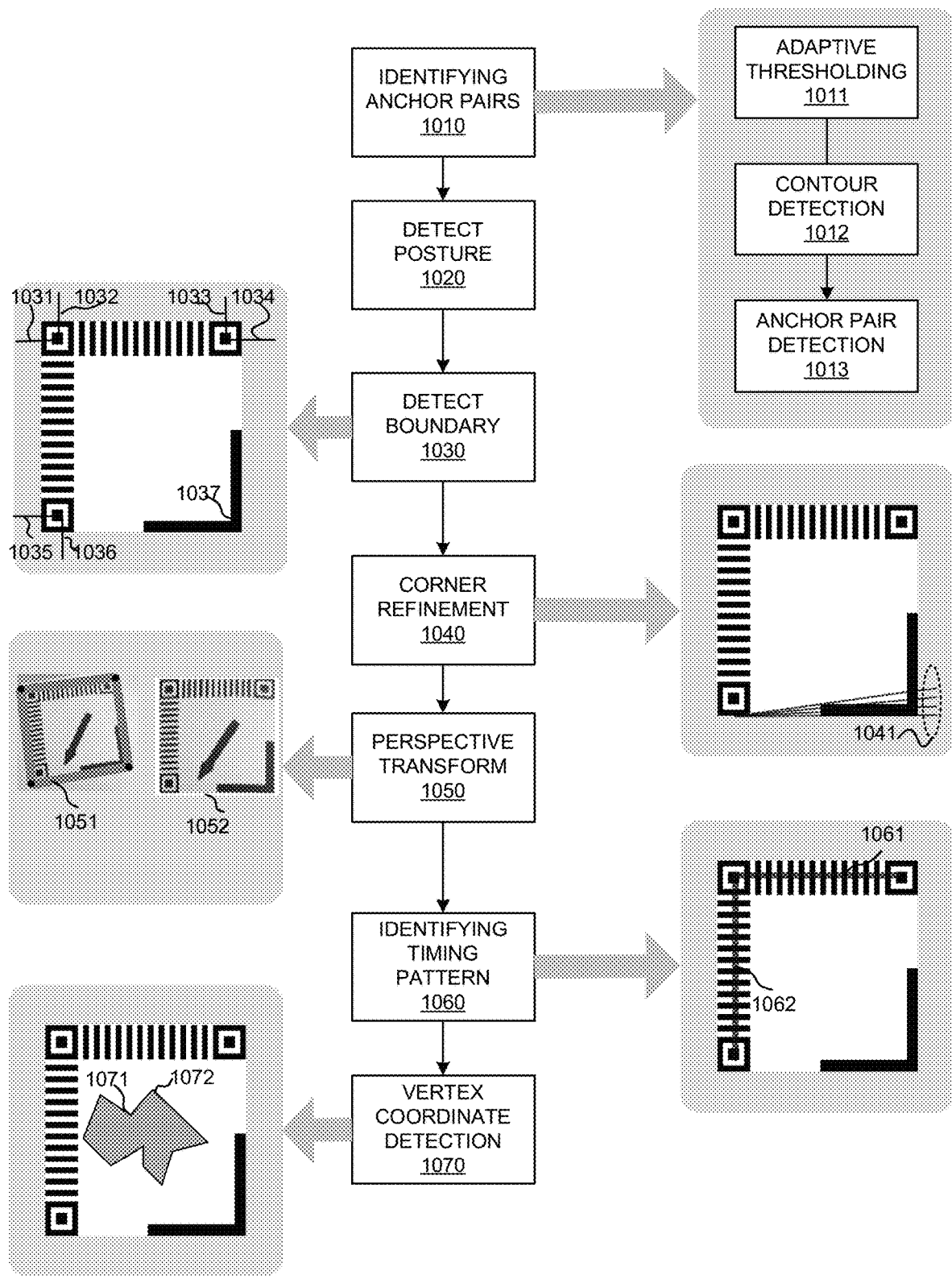
FIG. 10 illustrates exemplary diagrams for deriving vertex coordinates of a polygon of the ID polygon in the authentication area in accordance with embodiments of current invention.

FIG. 10 illustrates exemplary diagrams for deriving vertex coordinates of a polygon of the ID polygon in the authentication area in accordance with embodiments of current invention. At step 1010, the anchor pairs are identified. At step 1020, the posture of the authentication area is detected. At step 1030, the boundary is detected. Step 1040 performs corner refinement. Step 1050 performs a perspective transform. At step 1060, timing patterns are identified. Subsequently, step 1070 detects vertex coordinates.

To detect the anchor pairs, the anchor needs to be detected first. In one embodiment, the anchor pair detection involves adaptive thresholding at step 1011, detecting contours at step 1012, and anchor pairs detection at step 1013. Thresholding, in step 1011, is applied to the image. Thresholding is used to segment an image by setting all pixels whose intensity values are above a threshold to a foreground value and all the remaining pixels to a background value. Adaptive thresholding changes the threshold dynamically over the image. The technique can accommodate changing lighting conditions in the image. Outputs of this adaptive thresholding will be a binary picture. In contour detection at step 1012, contours of the picture will be detected. Contours are defined as the line joining all the points along the boundary of an image that are having the same intensity. Any contours with two children contours will be targeted as possible anchors. Then, the anchor can be confirmed after using a 1:1:3:1:1 scanning method as in scanning the anchors of a QR code. For instance, refer to the authentication area in FIG. 8. If a horizontal line is drawn across the center of the anchor, the line will cut across 1(black) module, then 1(white) module, then 3(black) modules, then 1(white) module and finally 1(black) module, hence the 1:1:3:1:1 scanning. Since there may be more than three anchors detected because of background noises, it is necessary to identify the correct ones. The three anchors of the authentication area form a straight right triangle with {90°, 45°, 45° } degrees for its internal angles. In step 1013, a simple loop with a mean square cost function will be used to compare the angles of each three anchors. The anchor pairs that meet the {90°, 45°, 45° } degrees will become the final anchors of the picture.

In step 1020, the orientation of the anchors is detected. The anchor with the largest degrees, i.e., 90° degree, will be the anchor of the upper left-hand side while the other two will take positions of the upper right and lower left in the authentication area.

In step 1030, detecting the boundary establishes the foundation to calculate the coordinates of the vertices. Once the posture is obtained, finding the up and left boundary is straightforward. Refer to the diagram in FIG. 11. The left and up boundary can be obtained simply by connecting the lines BC and DE where B, C, D and E are the midpoints of the three anchors.

The bottom right corner is detected at step 1040 by corner refinement. A corner refinement algorithm is developed to derive an accurate bottom right corner. Lines 1041 are radiating from the bottom right corner of the authentication area. When it radiates with a higher angle, it will hit the black solid Bottom Anchor. The line will radiate from a higher to lower position until the black pixel count drops to zero. Likewise, the boundary from point F will radiate lines towards the Bottom Anchor until it hits a white pixel. The intersection of the final rotation of these two lines becomes the bottom right corner.

Step 1050 reduces the perspective distortion by solving the nomography matrix with the corners obtained in step 1040. 1051 is an exemplary output from step 1040. The image is distorted. Step 1050 performs perspective transform and reduces the perspective distortion. 1052 is the output after the perspective transformation.

Step 1060 identifies timing patterns. To determine the number of rows and columns of the tag, timing patterns 1061 and 1062 are added to the top and the right of the authentication area. A scan line process can be applied to the picture. The function counts the number of changes between the white pixel and the black pixel to determine the number of rows and columns. The granularity of the timing patterns can be configurable and updated dynamically based on predefined rules.

With all preprocessing steps, the coordinates of polygon vertices in respect to the boundary of the authentication, such as 1071 and 1072 are determined at step 1070. A modified edge crossing detection algorithm to determine the coordinates is adopted. This approach is using lines that ray-cast from the center of the polygon. The first edge that the line crosses becomes a feature point. After all the feature points are collected, a nearest neighbor with an L2 norm algorithm is applied to these feature points. Fifty frames of the tag are recorded. The average of each finalized feature point is obtained and becomes the coordinates of the vertex. The polygon vertex coordinates, its corresponding operator ID and the sticker image are stored in the blockchain.

Figure 11:
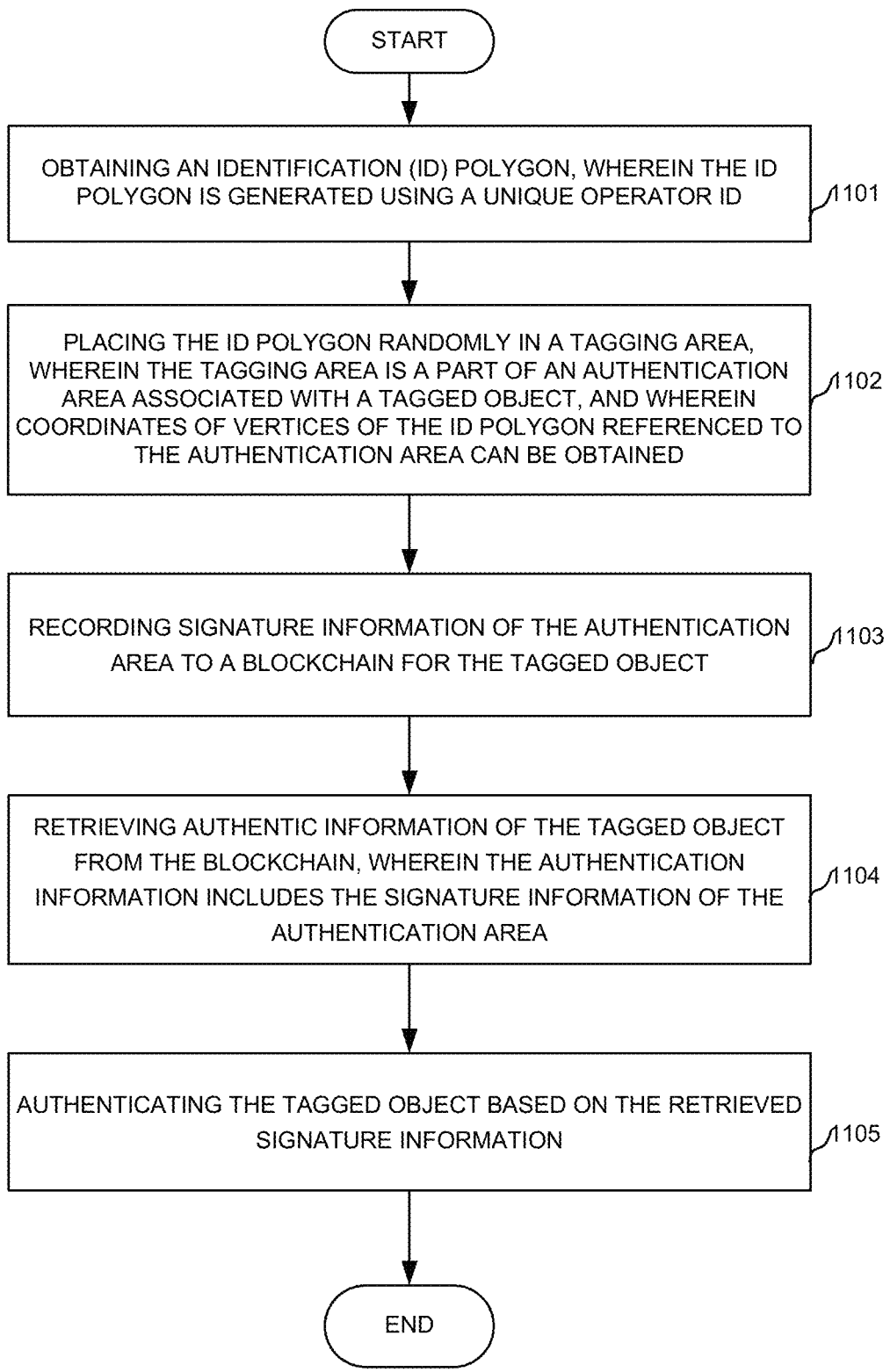
FIG. 11 illustrates an exemplary flow chart for polygon tagging scheme in accordance with embodiments of the current invention.

FIG. 11 illustrates an exemplary flow chart for polygon tagging scheme in accordance with embodiments of the current invention. At step 1101, an identification (ID) polygon is obtained, wherein the ID polygon is generated using a unique operator ID. At step 1102, the ID polygon is randomly placed in a tagging area, wherein the tagging area is a part of an authentication area associated with a tagged object, and wherein coordinates of vertices of the ID polygon referenced to the authentication area can be obtained. At step 1103, signature information of the authentication area is recorded to a blockchain for the tagged object. At step 1104, authentic information of the tagged object is retrieved from the blockchain, wherein the authentication information includes the signature information of the authentication area. At step 1105, the tagged object is authenticated based on the retrieved signature information.

Figure 12:
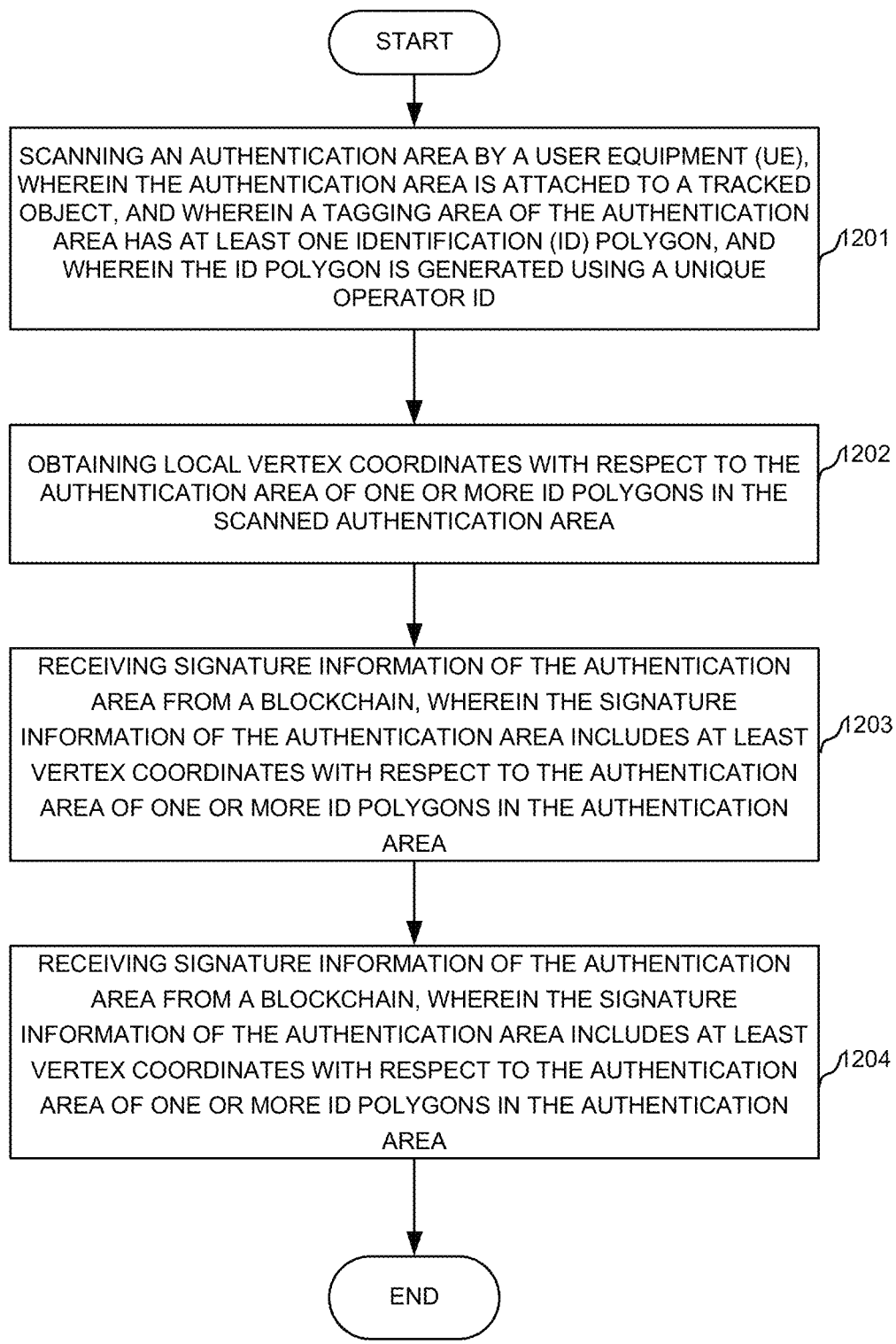
FIG. 12 illustrates an exemplary flow chart for a user equipment application to authenticate an ID polygon using the polygon tagging scheme in accordance with embodiments of the current invention.

FIG. 12 illustrates an exemplary flow chart for a user equipment application to authenticate an ID polygon using the polygon tagging scheme in accordance with embodiments of the current invention. At step 1201, the user equipment APP scans an authentication area wherein the authentication area is attached to a tagged object, and wherein a tagging area of the authentication area has at least one identification (ID) polygon, and wherein the ID polygon is generated using a unique operator ID. At step 1202, the UE APP obtains local vertex coordinates with respect to the authentication area of one or more ID polygons in the scanned authentication area. At step 1203, the UE APP retrieves signature information of the authentication area from a blockchain, wherein the signature information of the authentication area includes at least vertex coordinates with respect to the authentication area of one or more ID polygons in the authentication area. At step 1204, the UE APP authenticates the tagged object by comparing the local vertex coordinates with the retrieved signature information.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed:

1. A method, comprising:
   obtaining an identification (ID) polygon, wherein the ID polygon is generated using a unique operator ID;
   placing the ID polygon randomly in a tagging area, wherein the tagging area is a part of an authentication area associated with a tagged object, and wherein coordinates of vertices of the ID polygon referenced to the authentication area can be obtained;
   recording signature information of the authentication area to a blockchain for the tagged object;
   retrieving authentic information of the tagged object from the blockchain, wherein the authentication information includes the signature information of the authentication area; and
   authenticating the tagged object based on the retrieved signature information.

2. The method of claim 1, wherein the ID polygon is obtained by polygonizing the associated unique operator ID.

3. The method of claim 1, wherein the ID polygon is an ID code of the associated unique operator ID superposed on a predefined polygon, and wherein the ID code is one of a QR code or a bar code.

4. The method of claim 1, wherein the authentication area comprises a plurality of anchor corners for boundary and posture detection, timing patterns for coordinates identification in the tagging area, and the tagging area.

5. The method of claim 4, wherein the authentication area is a rectangle, wherein three corners of the rectangle are squared anchors and a fourth corner is marked with two border lines, and wherein the timing patterns are marked on two boundaries of the rectangle each connected with a pair of the squared anchors corners.

6. The method of claim 1, wherein the signature information of corresponding authentication area comprises at least one of a photographic image of the authentication area, unique ID of each ID polygon in the authentication area, and coordinates of each vertices of each ID polygon in the authentication area.

7. The method of claim 1, wherein the tagging area of corresponding authentication area includes one or more ID polygons.

8. The method of claim 1, further comprising:
   appending additional signature information of one or more additional authentication areas associated with the tagged object to the blockchain.

9. The method of claim 1, wherein the authenticating the tagged object involves:
   scanning and obtaining vertex coordinates of one or more local ID polygons in one or more authentication areas attached to the tagged object;
   comparing the obtained coordinates of vertices of each local ID polygon with vertex coordinates of each corresponding stored ID polygons with a same unique operator ID, wherein the stored vertex coordinates of each ID polygon are obtained based on retrieved signature information of authentication area that contains the corresponding ID polygon; and
   determining whether each local ID polygon matches each corresponding stored ID polygon.

10. A system, comprising:
    a tagged object with one or more attached authentication areas, wherein each authentication area has a tagging area;
    a blockchain that contains one or more signature information of the one or more authentication areas of the tagged object;
    a first operator with an operator identification (ID) that obtains an ID polygon generated using the operator ID, randomly places the ID polygon in a first tagging area of a first authentication area, wherein the first authentication area is one of the attached authentication areas of the tagged object, and wherein coordinates of vertices of the ID polygon referenced to the first authentication area is obtained, records signature information of the first authentication area to the blockchain;
    a second operator that retrieves authentic information of the tagged object from the blockchain, wherein the authentication information includes the signature information of the first authentication area, and authenticates the tagged object based on the retrieved signature information.

11. The system of claim 10, wherein the ID polygon is obtained by polygonizing the associated unique operator ID.

12. The system of claim 10, wherein the ID polygon is an ID code of the associated unique operator ID superposed on a predefined polygon, and wherein the ID code is one of a QR code and a bar code.

13. The system of claim 10, wherein each authentication area comprises a plurality of anchor corners for boundary and posture detection, timing patterns for coordinates identification in the tagging area, and the tagging area.

14. The system of claim 10, wherein the signature information of corresponding authentication area comprises at least one of a photographic image of the authentication area, unique ID of each ID polygon in the authentication area, and coordinates of each vertices of each ID polygon in the authentication area.

15. The system of claim 10, wherein the tagging area of corresponding authentication area includes one or more ID polygons.

16. The system of claim 10, wherein the second operator upon authenticated the tagged object, obtains a second ID polygon based on a second operator ID, places randomly the second ID polygon in a tagging area of a second authentication area attached to the tagged object, and appends signature information of the second authentication area to the blockchain.

17. The system of claim 10, wherein the authenticating the tagged object involves:
    scanning and obtaining vertex coordinates of one or more local ID polygons in one or more authentication areas attached to the tagged object;
    comparing the obtained coordinates of vertices of each local ID polygon with vertex coordinates of each corresponding stored ID polygons with a same unique operator ID, wherein the stored vertex coordinates of each ID polygon are obtained based on retrieved signature information of authentication area that contains the corresponding ID polygon; and determining whether each local ID polygon matches each corresponding stored ID polygon.

18. A method, comprising:

scanning an authentication area by a user equipment (UE), wherein the authentication area is attached to a tagged object, and wherein a tagging area of the authentication area has at least one identification (ID) polygon, and wherein the ID polygon is generated using a unique operator ID;

obtaining local vertex coordinates with respect to the authentication area of one or more ID polygons in the scanned authentication area;

receiving signature information of the authentication area from a blockchain, wherein the signature information of the authentication area includes at least vertex coordinates with respect to the authentication area of one or more ID polygons in the authentication area; and authenticating the tagged object by comparing the local vertex coordinates with the retrieved signature information.

19. The method of claim 18, wherein the ID polygon is obtained by polygonizing the associated unique operator ID.

20. The method of claim 18, wherein the ID polygon is an ID code of the associated unique operator ID superposed on a predefined polygon, and wherein the ID code is one of a QR code and a bar code.

* * * * *